(12) United States Patent
Mizushima et al.

(10) Patent No.: US 11,481,114 B2
(45) Date of Patent: Oct. 25, 2022

(54) STORAGE APPARATUS AND CONTROL METHOD OF STORAGE APPARATUS

(71) Applicant: Hitachi, Ltd., Tokyo (JP)

(72) Inventors: Nagamasa Mizushima, Tokyo (JP); Masahiro Tsuruya, Tokyo (JP); Masahiro Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 924 days.

(21) Appl. No.: 16/325,942

(22) PCT Filed: Nov. 8, 2016

(86) PCT No.: PCT/JP2016/083021
§ 371 (c)(1),
(2) Date: Feb. 15, 2019

(87) PCT Pub. No.: WO2018/087795
PCT Pub. Date: May 17, 2018

(65) Prior Publication Data
US 2019/0205035 A1    Jul. 4, 2019

(51) Int. Cl.
*G06F 3/06* (2006.01)
*G06F 12/02* (2006.01)
*G06F 12/00* (2006.01)
*G06F 12/04* (2006.01)

(52) U.S. Cl.
CPC .............. *G06F 3/0608* (2013.01); *G06F 3/06* (2013.01); *G06F 3/061* (2013.01); *G06F 3/064* (2013.01); *G06F 3/0629* (2013.01); *G06F 3/0634* (2013.01); *G06F 3/0656* (2013.01); *G06F 3/0659* (2013.01); *G06F 3/0661* (2013.01); *G06F 3/0679* (2013.01); *G06F 3/0688* (2013.01); *G06F 12/00* (2013.01);
(Continued)

(58) Field of Classification Search
CPC .... G06F 3/0608; G06F 3/0629; G06F 3/0656; G06F 3/0659; G06F 3/0679; G06F 12/0246; G06F 2212/401
See application file for complete search history.

(56) References Cited

U.S. PATENT DOCUMENTS

2016/0110112 A1    4/2016   Yeh
2016/0328154 A1   11/2016   Mizushima et al.
2017/0123704 A1*   5/2017   Sharma ................. G06F 3/0685

FOREIGN PATENT DOCUMENTS

JP    2002-335486 A    11/2002
WO   2015/128955 A1     9/2015

* cited by examiner

*Primary Examiner* — Edward J Dudek, Jr.
(74) *Attorney, Agent, or Firm* — Procopio, Cory, Hargreaves & Savitch LLP

(57) ABSTRACT

A storage apparatus includes: a flash memory that provides a storage area; a controller that controls writing and reading of data to and from the storage area; and a buffer memory that temporarily stores data to be written in the storage area, in which the controller selects one compression method from a first reversible compression method and a second reversible compression method based on access performance to the flash memory, and determines to compress data based on the selected one compression method and to write the compressed data to the storage area, and the first reversible compression method has a lower compression ratio and a slower compression speed than the second reversible compression method.

13 Claims, 10 Drawing Sheets

(52) U.S. Cl.
CPC .......... *G06F 12/0246* (2013.01); *G06F 12/04* (2013.01); *G06F 2212/401* (2013.01)

| COMPRESSION RATIO OF FIRST METHOD | PROCESS PERFORMANCE | | DETERIORATION OF COMPRESSION RATIO DURING COMPRESSION WITH SECOND METHOD | PROCESS PERFORMANCE | |
|---|---|---|---|---|---|
| | COMPRESSION | DECOMPRESSION | | COMPRESSION | DECOMPRESSION |
| 1~20% | 2.6GB/s | 3.0GB/s | +10.8% | 2.6GB/s | 2.6GB/s |
| 21~40% | 2.3GB/s | 2.5GB/s | +7.3% | 2.6GB/s | 2.6GB/s |
| 41~60% | 2.0GB/s | 2.0GB/s | +3.3% | 2.6GB/s | 2.6GB/s |
| 61~80% | 1.2GB/s | 1.2GB/s | +4.2% | 2.6GB/s | 2.6GB/s |
| 81~100% | 1.0GB/s | 1.0GB.s | +2.4% | 2.5GB/s | 2.6GB/s |

FIG. 4

| NUMBER OF FREE ENTRIES IN WRITE BUFFER | DISTRIBUTION RATIO | |
|---|---|---|
| | FIRST METHOD | SECOND METHOD |
| 20 OR MORE | 100% | 0% |
| 15~19 | 75% | 25% |
| 10~14 | 50% | 50% |
| 5~9 | 25% | 75% |
| 0~4 | 0% | 100% |

| COMPRESSION RATIO OF FIRST METHOD | COUNT 720 | | DECOMPRESSION PERFORMANCE OF FIRST METHOD 725 | DECOMPRESSION PERFORMANCE OF SECOND METHOD 726 | WHEN COMPRESSING WITH SECOND METHOD 730 | | DETERIORATION DEGREE OF COMPRESSION RATIO BY IMPROVEMENT OF 1 GB/s (IMPROVEMENT COST) 750 |
|---|---|---|---|---|---|---|---|
| 710 | CORRE-SPONDING 721 | METHOD CHANGE 722 | | | DETERIORATION OF COMPRESSION RATIO | IMPROVEMENT OF DECOMPRESSION PERFORMANCE 740 | |
| 1~20% | 4163 | 0 | 3.0GB/s | 2.6GB/s | +10.8% | -0.4GB/s | --- |
| 21~40% | 6291 | 0 | 2.5GB/s | 2.6GB/s | +7.3% | +0.1GB/s | +73 |
| 41~60% | 8072 | 0 | 2.0GB/s | 2.6GB/s | +3.3% | +0.6GB/s | +5.5 |
| 61~80% | 7255 | 0 | 1.2GB/s | 2.6GB/s | +4.2% | +1.4GB/s | +3.0 |
| 81~100% | 5587 | 927 | 1.0GB.s | 2.6GB/s | +2.4% | +1.6GB/s | +1.5 |
| UNCLEAR | 12654 | | | | | | |

*FIG. 9A*

STORAGE APPARATUS AND CONTROL METHOD OF STORAGE APPARATUS

CROSS-REFERENCE TO RELATED APPLICATIONS

This application is a U.S. National Stage entry of PCT Application No: PCT/JP2016/083021 filed Nov. 8, 2016, the contents of which are incorporated herein by reference.

TECHNICAL FIELD

The present invention relates to a storage apparatus and a control method of a storage apparatus.

BACKGROUND ART

In the related art, a non-volatile storage medium capable of random access, for example, a magnetic disk or an optical disk is used as a data storage medium of a storage apparatus. In particular, recently, a storage apparatus including multiple compact disk drives has been mainly used.

In addition, along with the recent progress of semiconductor techniques, a non-volatile semiconductor memory capable of bulk erasing has been developed. Examples of the non-volatile semiconductor memory include a flash memory. A storage apparatus including a flash memory as a storage medium is considered to be superior in terms of power-saving and high-speed access as compared to a storage apparatus including multiple compact disk drives.

On the other hand, a flash memory block has a limited erase count (limited lifetime). A block that reaches its lifetime fails to erase and cannot execute next erasing. A page in this block cannot be made to be unwritten. That is, as the number of blocks that reach their lifetime increases, exhaustion of unwritten pages cannot be resolved, and the storage apparatus becomes out of use.

To enable long-term use of a flash memory, it is necessary to reduce block erase frequency of the flash memory such that lifetime can be extended. That is, to reduce a speed at which unwritten pages are consumed, it is desired to reduce an amount of data to be written to the flash memory.

As a background art in this technical field, there is disclosed in WO2015/128955 (PTL 1). PTL 1 describes "A storage device provides a logical space based on a storage medium that is configured by a plurality of logical areas to a higher-level apparatus, and a base data range exists in the storage medium for each logical area. The storage device reads the base data from the base data range corresponding to a write destination logical area to which a write destination logical address belongs, and generates difference data that is an exclusive OR of first data that is the base data and second data that is any one of data based on write data and the write data. The storage device generates compressed difference data by compressing the difference data, writes the compressed difference data to the storage medium, and associates a difference data range that is a range in which the compressed difference data is written with the write destination logical area" (refer to Abstract).

CITATION LIST

Patent Literature

PTL 1: WO2015/128955

SUMMARY OF INVENTION

Technical Problem

Regarding a technique of compressing data as in the technique described in PTL 1, it is desired to reduce a compression ratio (value obtained by dividing size of data after compression by size of data before compression) as much as possible. The reason is that, as the compression ratio becomes lower, an amount of data to be stored in a flash memory can be reduced. However, a compression method capable of reducing the compression ratio has a problem in that compression or decompression speed is slow regarding data that is difficult to compress. When the compression or decompression speed is slow, write performance or read performance of the storage apparatus is also slow. Therefore, in the related art, as in the technique described in PTL 1, a compression method in which the compression ratio is relatively high although the compression or decompression speed is sufficiently fast regarding any data is adopted.

Therefore, an object of one aspect of the present invention is to reduce the compression ratio of data to be stored in a flash memory while securing a speed at which data is written to the flash memory and a speed at which data is read from the flash memory, and another object thereof is to extend the lifetime of the flash memory.

Solution to Problem

To achieve the objects, one aspect of the present invention adopts the following configurations. A storage apparatus includes: a flash memory that provides a storage area; a controller that controls writing and reading of data to and from the storage area; and a buffer memory that temporarily stores data to be written in the storage area, in which the controller selects one compression method from a first reversible compression method and a second reversible compression method based on access performance to the flash memory, and determines to compress data based on the selected one compression method and to write the compressed data to the storage area, and the first reversible compression method has a lower compression ratio and a slower compression speed than the second reversible compression method.

Advantageous Effects of Invention

According to one aspect of the present invention, the compression ratio of data to be stored in a flash memory can be reduced while securing a speed at which data is written to the flash memory and a speed at which data is read from the flash memory, and the lifetime of the flash memory can be extended.

Objects, configurations, and effects other than those described above will be clarified by describing the following embodiments.

BRIEF DESCRIPTION OF DRAWINGS

FIG. 4 is a diagram illustrating an example of a result of comparing characteristics of two compression methods in Embodiment 1.

FIG. 9A is a diagram illustrating an example of a change evaluation table in Embodiment 1.

DESCRIPTION OF EMBODIMENTS

Figure 1:
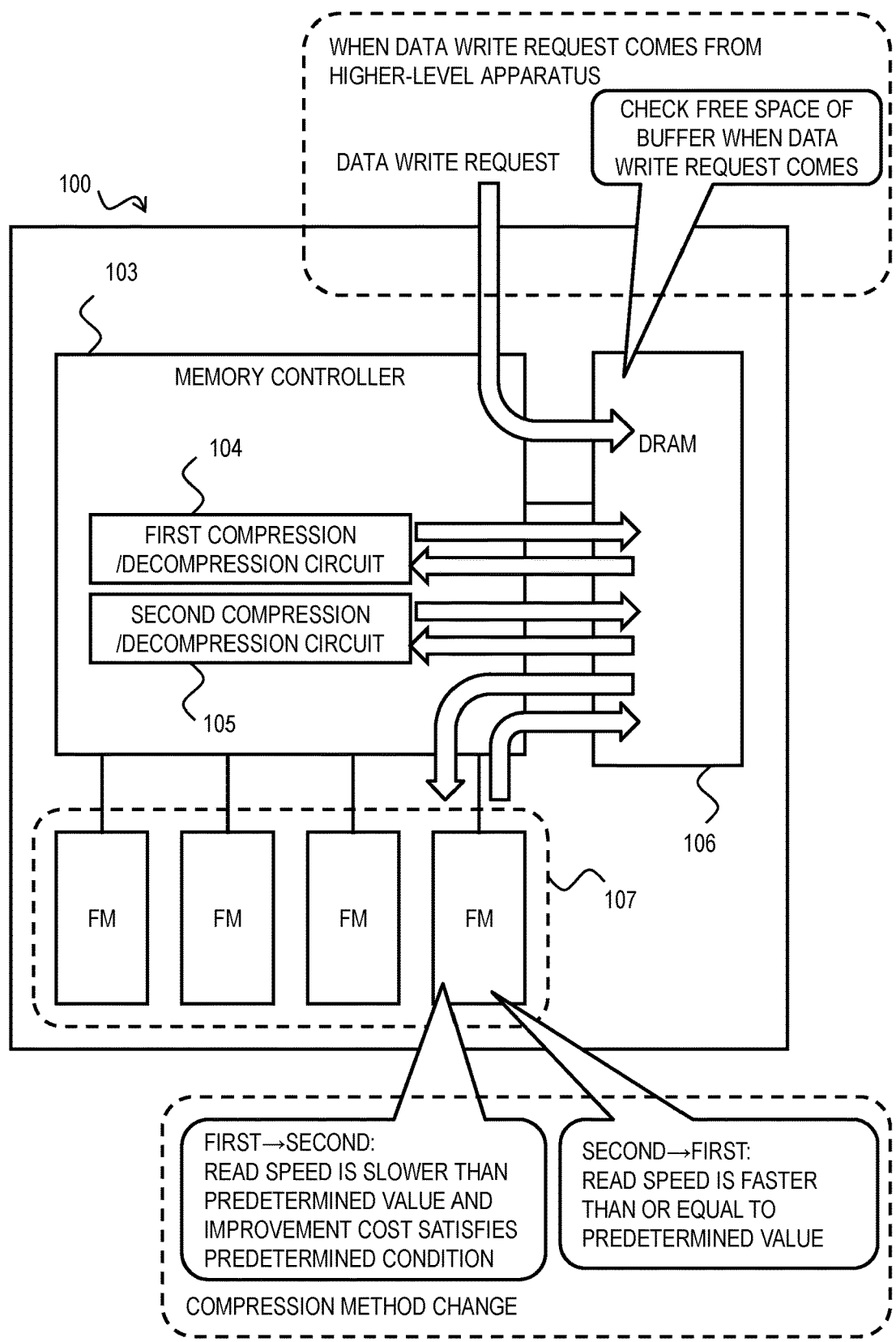
FIG. 1 is a diagram illustrating a summary example of an operation of a flash memory module according to Embodiment 1.

FIG. 1 is a diagram illustrating a summary example of an operation of a FM (flash memory) module according to an embodiment. For example, an FM module 100 according to the embodiment includes: a flash memory 107 that provides a storage area; a memory controller 103 that controls writing and reading of data to and from the storage area; and a DRAM 106 that functions as a buffer memory temporarily storing data to be written in the storage area. For example, the memory controller 103 includes: a first compression/decompression circuit 104 that compresses and decompresses data with a first reversible compression method; and a second compression/decompression circuit 105 that compresses and decompresses data with a second reversible compression method. The first reversible compression method has a lower compression ratio and a slower compression/decompression speed than the second reversible compression method.

When writing data to the flash memory 107, the memory controller 103 selects either the first reversible compression method or the second reversible compression method based on access performance to the flash memory 107, compresses data using the selected compression method, and writes the compressed data to the storage area of the flash memory 107.

Specifically, for example, the memory controller 103 checks a size of a free space of the buffer memory when receiving a data write request from a higher-level apparatus. For example, as the free space of the buffer memory increases, the memory controller 103 selects the first reversible compression method at a higher proportion. As a result, the memory controller 103 can reduce the compression ratio of data to be stored in the flash memory 107 while securing a speed at which data is written to the flash memory 107.

For example, when first data compressed with one compression method from the first reversible compression method and the second reversible compression method is already written to the flash memory 107, the memory controller 103 determines whether or not to execute a compression method change of decompressing the first data from the storage area based on a speed at which data written to the flash memory 107 is read, compressing the decompressed data with another compression method, and storing the compressed data again in the storage area of the flash memory 107.

If the first data is compressed with the first reversible compression method, for example, when the memory controller 103 determines that an average speed at which data stored in the flash memory 107 is read is slower than a predetermined value and an improvement cost satisfies a predetermined condition, the memory controller 103 determines to execute the compression method change, the improvement cost being a quotient obtained by dividing an improvement degree of the decompression speed if the compression method change is executed by a deterioration degree of the compression ratio if the compression method change is executed.

If the first data is compressed with the second reversible compression method, for example, when the memory controller 103 determines that an average speed at which data stored in the flash memory 107 is read is faster than or equal to a predetermined value, the memory controller 103 determines to execute the compression method change.

As a result, the memory controller 103 can reduce the compression ratio of data to be stored in the flash memory 107 while securing a speed at which data is read from the flash memory 107.

Embodiment 1

[1] Configuration of Storage System to which Present Invention is Applied

Figure 2:
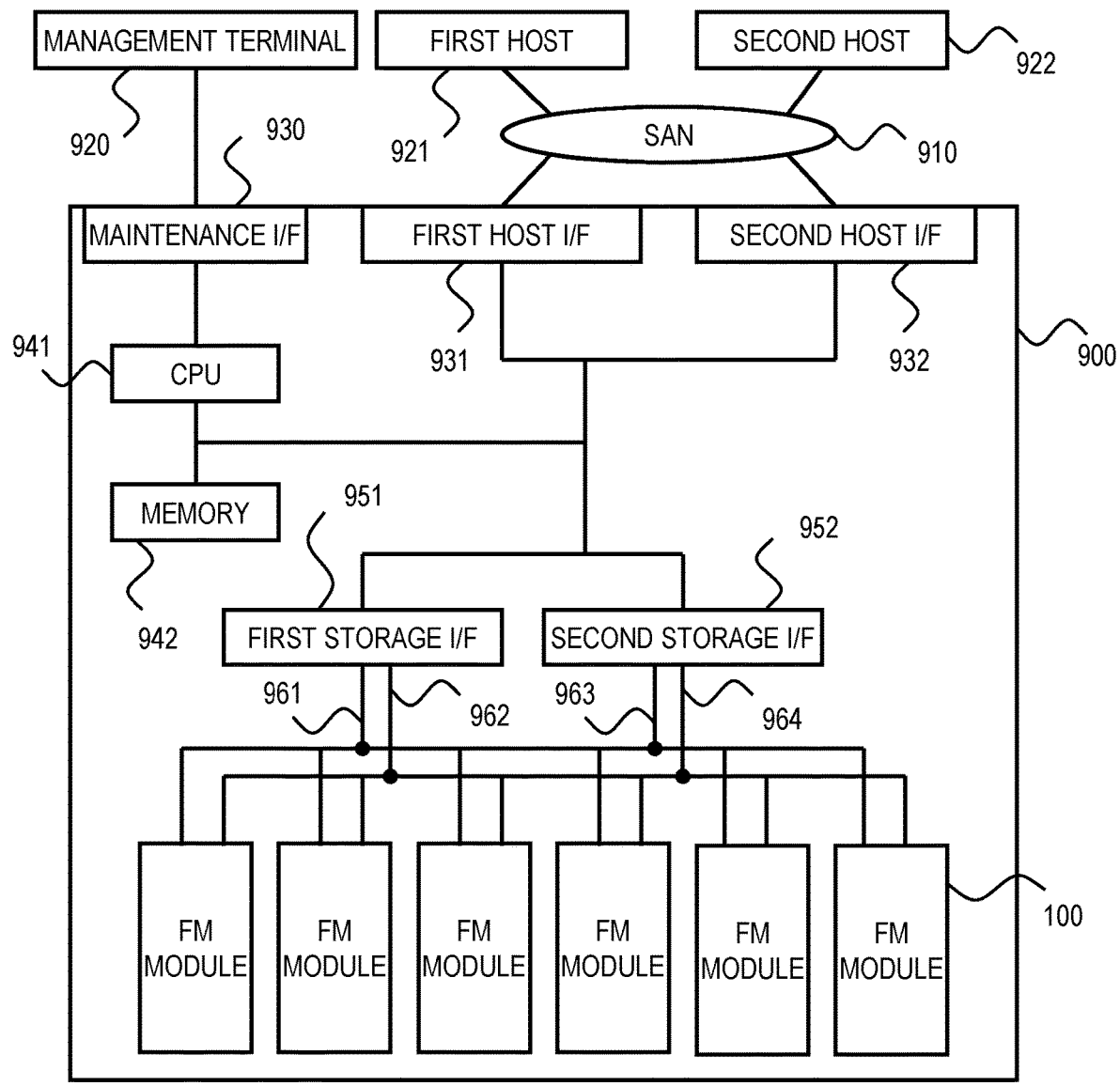
FIG. 2 is a block diagram illustrating a configuration example of a computer system on which the flash memory module according to Embodiment 1 is mounted.

FIG. 2 is a block diagram illustrating a configuration example of a computer system. For example, the computer system includes a storage apparatus 900, a first host 921, a second host 922 (hereinafter, the first host 921 and the second host 922 will be simply collectively referred to as "host"), a management terminal 920, and a storage area network (SAN) 910.

The storage apparatus 900 analyzes a command transmitted from the host and executes reading/writing of data in a storage area of the storage apparatus 900. For example, the storage apparatus 900 includes a first host interface (I/F) 931, a second host I/F 932, (hereinafter, the first host I/F 931 and the second host I/F 932 will be simply collectively referred to as "host I/F"), a first storage I/F 951, a second storage I/F 952 (hereinafter, the first storage I/F 951 and the second storage I/F 952 will be simply collectively referred to as "storage I/F"), a maintenance I/F 930, a CPU 941, a memory 942, connectors 961 to 964, and the flash memory module (hereinafter, also will be referred to as "FM module") 100.

The host I/F is an interface that receives data, a control command, or the like from the host. The storage I/F is an interface that transmits data or a control command to the FM module 100. The maintenance I/F 930 is an interface that is connected to the management terminal 920 and receives a control command or the like relating to management or maintenance from the management terminal 920.

The central processing unit (CPU) 941 includes a processor, functions as an arithmetic processing unit, and has a function of controlling an overall operation of the storage apparatus 900 according to various programs, operation parameters, or the like stored in the memory 942. Specifically, for example, the CPU 941 processes inputs and outputs (data I/O) of user data between the storage apparatus 900 and the host to issue to the FM module 100 a write command for writing user data to the FM module 100 or to issue to the FM module 100 a read command for reading user data from the FM module 100.

For example, the memory 942 temporarily stores not only various programs, operation parameters, or the like but also control information or management information, user data written to the FM module 100, or user data read from the FM module 100.

FIG. 2 illustrates a configuration example in which the storage apparatus 900 includes six FM modules 100. However, the number of FM modules 100 is not limited to the present example. The FM modules 100 are connected to the storage I/F through the connectors 961 to 964. Data and various control commands received from the host through the connectors 961 to 964 are written to the FM modules 100. The configuration example of the FM modules 100 will be described below using FIG. 3. In the embodiment, the FM module 100 is integrated with the storage apparatus 900. However, the present invention is not limited to the present example, and the FM module 100 may be a device that is provided separately from the storage apparatus 900.

The host is connected to the storage apparatus 900 through the SAN and transmits a data read/write request to the storage apparatus 900. The host is a computer system including information processing resources such as the CPU and the memory and may be, for example, a personal computer, a work station, or a mainframe. For communication between the host and the storage apparatus 900, for example, a block protocol such as small computer system interface (SCSI) is used. For example, the host includes: an information input device such as a keyboard, a switch, a pointing device, or a microphone; and an information output device such as a monitor display or a speaker.

The management terminal 920 is a computer system including information processing resources such as the CPU and the memory and may be, for example, a personal computer, a work station, or a mainframe. The CPU functions as an arithmetic processing unit, and controls an operation of the management terminal 920 according to a program, an operation parameter, or the like stored in the memory. For example, the management terminal 920 includes: an information input device such as a keyboard, a switch, a pointing device, or a microphone; and an information output device such as a monitor display or a speaker, and manages the storage apparatus 900 or the like according to an input of an operator or the like.

FIG. 2 illustrates an example in which the number of connectors that connect the host and the FM module 100 is two. However, the number of connectors is not limited to the present example. Likewise, the standard of each of the connectors and the interfaces is not limited to a specific standard. Examples of a representative standard applied to the SAN 910 include fibre channel (FC), SCSI, internet small computer system interface (iSCSI), and serial attached SCSI (SAS). The computer system may not include the SAN 910, and a connection form between the host and the FM module 100 in the computer system may be direct attached storage (DAS).

[2] Characteristics and Handling Method of Flash Memory

Next, characteristics and a handling method of the flash memory that is the storage medium of the FM module 100 will be described. When a long period of time has elapsed after writing data to the flash memory, data failure gradually increases and cannot be corrected even using an error correction code (ECC). Therefore, data is read from a page in which a predetermined time has elapsed after writing data, error in the read data is corrected, the data is transferred to another unwritten page, and the page in which the data is originally recorded is invalidated. This operation is called "refreshing".

The number of unwritten pages decreases along with the data rewriting or refreshing operation. The flash memory supports an operation called erasing for creating unwritten pages. When all unwritten pages are exhausted, all the pages in a block are invalidated such that the block is erased to generate new unwritten pages. This operation is called "reclamation".

The flash memory has a characteristic that a minimum erase unit is greater than a minimum write unit. Specifically, in the flash memory, a plurality (for example, 512) of pages are provided in one block, data is erased in units of blocks, and reading/writing of data is executed in units of pages. The size of one page is, for example, 16 KB. The flash memory includes multiple (for example, 1,000,000) pages, and an address is assigned to each of the pages.

The flash memory has a characteristic that data recorded in a page cannot be directly overwritten. If data recorded in a page is rewritten, another valid data stored in a block including the page is saved in another block, and the original block is erased. By writing new data to the erased block in units of pages, data rewriting is executed.

In such a data rewriting process in the flash memory, data erasing is executed in units of blocks. However, the time required for data erasing corresponding to one block of the flash memory is longer than the time required for data writing corresponding to one page. Accordingly, whenever data erasing corresponding to one block is executed to rewrite data corresponding to one page, the data rewriting performance of the flash memory deteriorates. That is, to maintain a state where a block in which data is not recorded is present at all times, it is desired to erase data from the flash memory during a post process in which a process corresponding to any one of read/write request from the host is not executed.

Typically, when data is written to the flash memory, data in a block is not erased per data rewriting. Typically, a method of writing additional data to an unused page where data is not recorded and invalidating the page where the original data before rewriting is recorded (process that disables reference from the higher-level apparatus such as the host) is adopted. That is, a correspondence between a data reference address for access from the higher-level apparatus such as the host to the storage apparatus 900 and an address of a page where the data is recorded dynamically changes.

However, when the data rewriting process is repeatedly executed, unused area in the flash memory is exhausted. Therefore, it is necessary to erase invalid data (for example, old data after rewriting) written to the flash memory such that the storage area is in a reusable state. Therefore, a block reproduction process of copying only valid data in a block including old data to unused area, erasing the block that is the copy source, and reproducing the erased block as an unused area is executed. This process called "reclamation" is a process that is necessary to rewrite data in the flash memory with high speed, and is preferentially executed, in particular, on a block including many pieces of invalid data.

On the other hand, the flash memory has a characteristic in that a block has a limited erase count. For example, an erase count up to 3000 per one block is secured. In this case, when data rewriting is concentrated on one block such that the erase count of the block is more than the secured count, data erasing may not be executed, and the block becomes unusable thereafter. Therefore, the number of usable blocks is reduced. Thus, to prevent concentration of the erasing process on a specific block, it is necessary to level the erase count, for example, by transferring stored data from a block where the erase count is large to a block where the erase count is small.

The flash memory has a characteristic that, once data is written to a page, data error increases over time only for maintaining the written data. To avoid data loss caused by data error, a parity based on an error correction code (ECC) is added in advance to data to be recorded. When a predetermined time has elapsed after the data is written, a refreshing process of reading the data, correcting the read data using the corresponding parity while data error is small, and transferring the corrected data to another page is executed. Even when this process is executed, it is necessary to level the erase count and consider the influence on the performance.

This way, when the flash memory is used as a storage medium, to maintain a state where a block in which data is not recorded is present at all times and to level the erase count, a process of dynamically associating a logical address provided to the higher-level apparatus with a physical address of a storage area and translating a physical address from a logical address during data writing is executed. That is, by sequentially changing the correspondence between the logical address provided to the higher-level apparatus and the physical address of the storage area, the higher-level apparatus may write data to a logical address space and may be managed such that a change in physical address during writing of additional data to an unused area is not necessarily taken into consideration.

[3] Configuration of FM Module to which Present Invention is Applied

Figure 3:
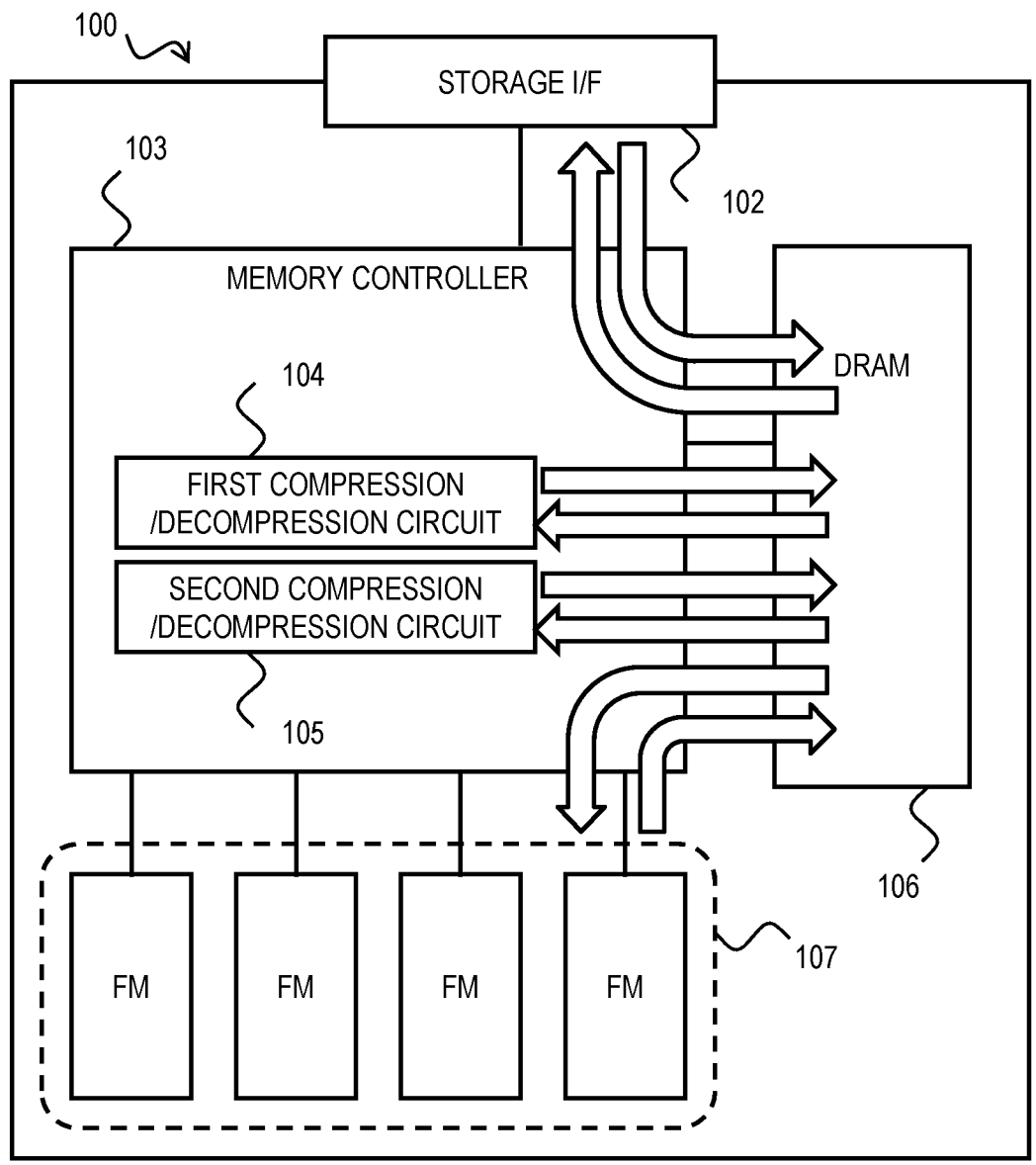
FIG. 3 is a block diagram illustrating a configuration example of the flash memory module according to Embodiment 1.

FIG. 3 is a block diagram illustrating a configuration example of the FM module 100. For example, the FM module 100 includes a storage I/F 102, the memory controller 103, one or more NAND flash memories (hereinafter, also referred to as "FM" or "flash memory") 107 including a plurality of chips, and the dynamic random access (DRAM) 106 as a volatile memory. For example, the memory controller 103 includes the first compression/decompression circuit 104 and the second compression/decompression circuit 105.

For example, the memory controller 103 includes a microprocessor and is connected to the storage I/F 102, the flash memory 107, and the DRAM 106. For example, the microprocessor executes content analysis of a read/write command received through the storage I/F 102, transmission and reception of read/write data, compression and decompression of data using the first compression/decompression circuit 104 and the second compression/decompression circuit 105, data transfer between the flash memory 107 and the DRAM 106, and the like.

The storage I/F 102 is an interface mechanism for connection to an external device or the like and receives user data in response to a write command issued by the external device or transmits user data to the external device in response to a read command issued by the external device.

The FM module 100 reduces the amount of data to be written to the flash memory by compressing data to be stored in the flash memory with a reversible compression technique. In the present embodiment, an example in which the FM module 100 compresses data using two kinds of reversible compression methods including a GZIP method and a LZ77 method will be described. Characteristics of the two methods will be described in the next chapter.

The first compression/decompression circuit 104 is, for example, an arithmetic unit mounted as hardware (logical circuit) in the memory controller 103. To reduce the amount of data to be stored in the flash memory 107, the first compression/decompression circuit 104 reversibly compresses plain-text data with the GZIP method and generates compressed data. The first compression/decompression circuit 104 decompresses data compressed with the GZIP method and generates original plain-text data.

The second compression/decompression circuit 105 is, for example, an arithmetic unit mounted as hardware (logical circuit) in the memory controller 103. To reduce the amount of data to be stored in the flash memory 107, the second compression/decompression circuit 105 reversibly compresses plain-text data with the LZ77 method and generates compressed data. The second compression/decompression circuit 105 decompresses data compressed with the LZ77 method and generates original plain-text data.

The DRAM 106 temporarily stores write data received from the external device. The DRAM 106 temporarily stores read data to be transmitted to the external device. The DRAM 106 functions as a write buffer that temporarily stores data to be written to the flash memory 107. The DRAM 106 functions as a read buffer that temporarily stores data read from the flash memory 107. The DRAM 106 functions as a transmission source of data compressed and decompressed using the first compression/decompression circuit 104 and the second compression/decompression circuit 105, and functions as a transmission destination of the compressed data and the decompressed data.

[4] Characteristics and Performance of Two Compression Methods

The LZ77 method (hereinafter, also referred to as "second method") applied to the second compression/decompression circuit 105 of the FM module 100 is the most basic reversible data compression method developed by Lempel and Ziv in 1977. The principle of the LZ77 method is a sliding dictionary compression. In the LZ77 method, a pointer is moved from the beginning to the end of a character string stream of a compression target. In the LZ77 method, at this time, the longest match to a character string that starts from the pointer is searched in a predetermined range (sliding dictionary) from the pointer toward the beginning. In the LZ77 method, the matching character string is converted into a copy code to reduce the amount of data. The copy code is obtained by encoding a distance J and a copy length L on a sliding dictionary as (L,J).

For example, when a character string stream "ABCDEBCDAECDEBB" is compressed with the LZ77 method, the compressed character string stream is expressed by copy codes as "ABCDE(3,4)AE(4,8)B". Three characters "BCD" and four characters "CDEB" are converted into a copy code (3,4) and a copy code (4,8), respectively. Due to the conversion, the amount of information corresponding to L number of characters is reduced to the amount of information corresponding to two numerical values L and J such that the amount of data is reduced. That is, as the copy length L of a character string increases, the amount of data reduced increases. Since the principles of compression and decompression of the LZ77 method are simple, the LZ77 method can be implemented as a pipelined logical circuit. Therefore, any data pattern can be processed with a fixed throughput, and thus the performance of compression and decompression is stable.

On the other hand, the GZIP method (hereinafter, also referred to as "first method") applied to the first compression/decompression circuit 104 of the FM module 100 is a reversible data compression method in which the amount of data can be further reduced by combining the LZ77 method with Huffman coding. In the Huffman coding, code lengths to be assigned vary depending on the appearance frequencies of characters or symbols. That is, in the Huffman coding, a character having a high appearance frequency is converted into a short code, and a character having a low appearance frequency is converted into a long code. For example, when the appearance frequencies of respective characters in a character string stream are A=2, B=5, C=3, D=1, and E=1, the respective characters are replaced with A=110, B=0, C=10, D=1110, and E=1111 by the Huffman coding using binary numbers.

That is, in the above-described example, B having the highest appearance frequency is encoded in 1 bit, and D and E having the lowest appearance frequency are encoded in 4 bits each. The character string stream before encoding includes five kinds of characters A to E, the five kinds of characters can be expressed in 3 bits (8-level), and the sum of the appearance frequencies is 12 (=2+5+3+1+1). Therefore, the amount of data of the character string stream before encoding is 3 bits×12=36 bits. It can be seen that, as a result of the Huffman coding, the amount of data of the character string stream can be reduced to 3 bits×2+1 bit×5+2 bits×3+4 bits×1+4 bits×1=25 bits.

In the present embodiment, the compression ratio is a value obtained by dividing the size of data after compression by the size of data before compression. A compression ratio of 100% represents that data cannot be compressed at all. In the GZIP method, the Huffman coding is used together such that the compression ratio can be made to be lower than that of the LZ77 method. However, in the Huffman coding, the conversion process cannot be started until the statistics of appearance frequencies are taken from all the input data. Therefore, the GZIP method has a demerit in that, as the amount of input data increases, the processing time increases.

Accordingly, if data can be sufficiently compressed with the LZ77 compression as the first half part of the GZIP method, the amount of input data for the Huffman coding as the second half part of the GZIP method is small, and thus the processing time decreases (that is, the throughput increases). However, if data cannot be sufficiently compressed with the LZ77 compression as the first half part of the GZIP method, the amount of input data for the Huffman coding as the second half part of the GZIP method is large, and thus the processing time decreases (that is, the throughput decreases).

In the decompression process of the GZIP method, the same performance can also be exhibited in the decoding process of decoding Huffman-coded data into LZ77-compressed data. That is, if data can be sufficiently compressed, the amount of data to be decoded is small, and the processing time decreases (that is, the throughput increases). However, if data cannot be sufficiently compressed, the amount of data to be decoded is large, and the processing time increases (that is, the throughput decreases).

FIG. 4 is a table illustrating characteristics of each of the first method and the second method. A column 210 shows data compression ratios in the first method. In an example of FIG. 4, for convenience, the column 210 shows the compression ratios of data compressed with the first method using five ranges at intervals of 20%. As the compression ratio becomes lower, data can be more sufficiently compressed.

In each of the compression ratio ranges of the first method, a column 220 shows an average compression throughput performance during compression using the first method and an average decompression throughput performance during decompression using the first method. In a compression ratio range of 20% or lower in the first method, the compression throughput performance is 2.6 GB/s or higher. However, in a compression ratio range of higher than 80% in the first method, the compression throughput performance decreases until 1.0 GB/s.

When a large amount of data that is difficult to compress is recorded, the compression/decompression throughput performance adversely affects the throughput performance of data writing/reading of the FM module 100. That is, the write performance increases only up to the average compression throughput performance, and the read performance increases only up to the average decompression throughput performance.

Hereinafter, for example, it is assumed that the target write performance of the FM module 100 is 1.5 GB/s and the target read performance of the FM module 100 is 2.2 GB/s. For example, the target write performance and the target read performance of the FM module 100 are predetermined. For example, if most of read/write data exceeds a compression ratio of 40%, the target read performance cannot be achieved. If most of read/write data exceeds a compression ratio of 60%, not only the target read performance but also the target write performance cannot be achieved.

In each of the compression ratio ranges of the first method, a column 230 shows the degree to which the compression ratio deteriorates on average when a case of data before compression corresponding to the compression ratio is compressed with the second method is compared to a case of the data compressed with the first method. In the example of FIG. 4, when a case of data before compression corresponding to the compression ratio range of 41% to 60% in the first method is compressed with the second method is compared to a case of the data compressed with the first method, the compression ratio deteriorates by +3.3% on average.

In each of the compression ratio ranges of the first method, a column 240 shows an average compression throughput performance when data before compression corresponding to the compression ratio is compressed with the second method and an average decompression throughput performance when data obtained by compressing data before compression corresponding to the compression ratio with the second method is decompressed with the second method. In the example of FIG. 4, the compression/decompression throughput performance of the data compressed with the second method is about 2.6 GB/s regardless of the compression ratio. Accordingly, even when most of read/write data exceeds a compression ratio of 60%, the target write/read performance of the FM module 100 can be achieved by adopting the second method.

[5] Basis of Reclamation Operation

Figure 5:
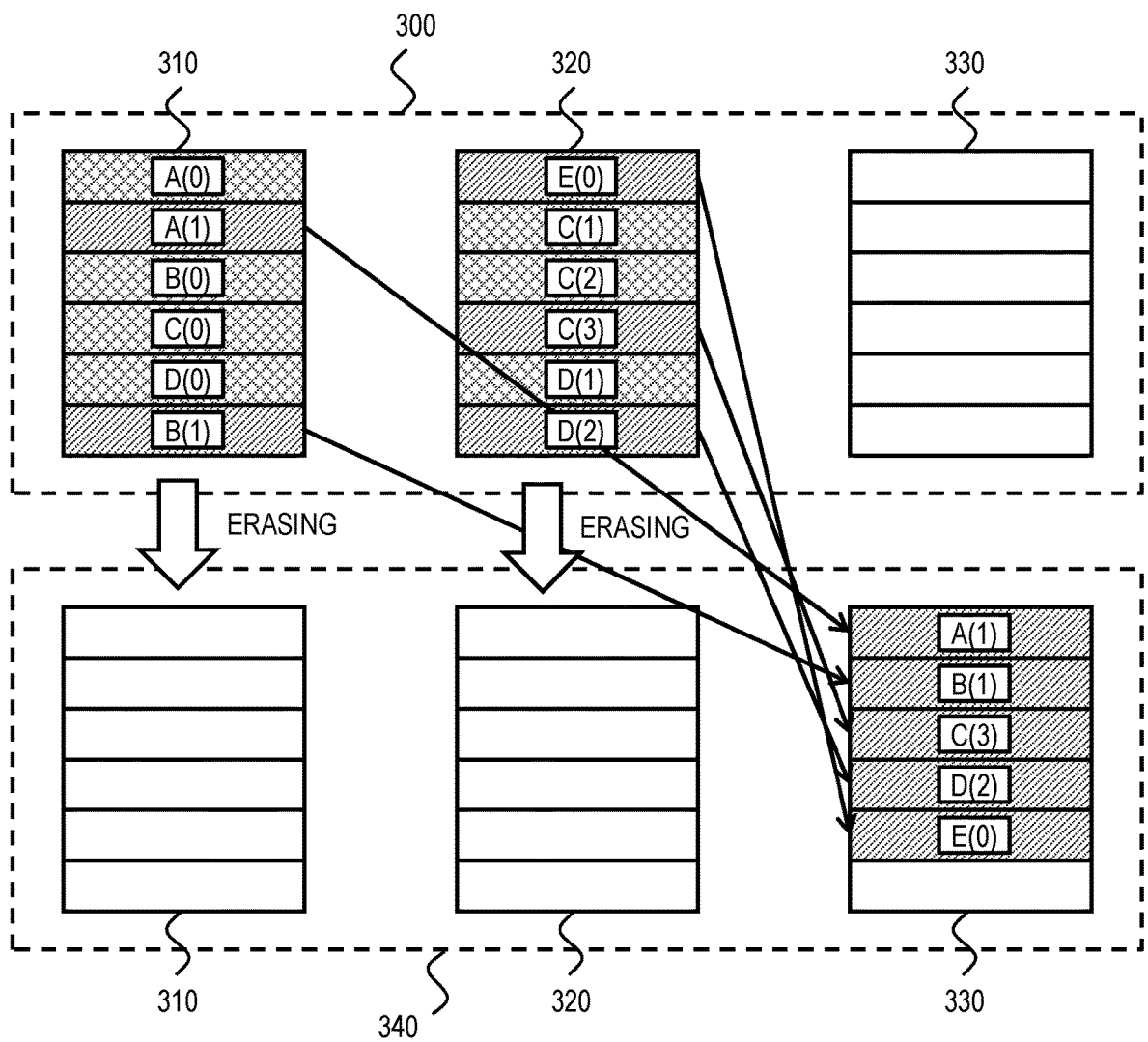
FIG. 5 is a diagram illustrating an example of a reclamation operation in Embodiment 1.

Next, referring to FIG. 5, an example of the reclamation operation executed by the FM module 100 will be described, and a method of increasing the number of unwritten pages in the flash memory 107 will be described. Each alphabet in FIG. 5 represents logical data, and a numerical value in parentheses represents a generation number of each logical data. For example, A(1) represents data that is updated once from A(0). Among data of the same alphabet, data having the largest value in parentheses is the most recent data, and other pieces of data are old data, that is, invalid data. For example, C(3) is the most recent data, and C(0) to C(2) are invalid data.

Each of a block group 300 before reclamation and a block group 340 after reclamation includes a block 310, a block 320, and a block 330 in the flash memory 107. In the block group 300 before reclamation, only the block 330 is a block in which all the pages are unwritten. Among recorded data of the block 310, A(1) and B(1) are the most recent data, and A(0), B(0), C(0), and D(0) are old data.

In the reclamation process, the memory controller 103 transfers A(1) and B(1) to the block 330 such that all the recorded data of the block 310 become invalid data (data that is not necessary to be stored). Among recorded data of the block 320 in the block group 300 before reclamation, C(3), D(2), and E(0) are the most recent data, and C(1), C(2), and D(1) are old data.

The memory controller 103 transfers C(3), D(2), and E(0) to the block 330 such that all the recorded data of the block 320 become invalid data (data that is not necessary to be stored). Finally, the memory controller 103 erases the blocks 310 and 320 such that the number of blocks in which all the pages are unwritten in the block group 340 after reclamation increases by two.

[6] Securing of Write Performance based on Monitoring of Write Buffer State

In the FM module 100 according to the present embodiment, the usage state of a write buffer on the DRAM 106 is monitored to secure that the write performance is higher than or equal to the target write performance based on the usage state. Hereinafter, the principle will be described.

First, referring to FIG. 6, an example of a method of using the write buffer present in the DRAM 106 of the FM module 100 will be described. The DRAM 106 includes a write buffer 400 for temporarily storing write data. When the FM module 100 receives write data from the host, the write data enters a free space 420 of the write buffer 400 such that the free space 420 becomes a used space 410.

The write data is read to be compressed by the first compression/decompression circuit 104 or the second compression/decompression circuit 105. When the compression process ends, the compressed write data is written again to the original used space 410. The compressed write data is written to an unwritten page in the flash memory 107. When the writing process ends, the used space 410 which was being used by the write data is opened and is treated as the free space 420 again.

In the above-described process, if a speed at which the used space 410 returns to the free space 420 is faster than a speed at which the free space 420 changes to the used space 410, the free space 420 of the write buffer is not exhausted. However, if the compression process performance of the first compression/decompression circuit 104 is slower than a reception throughput of the write data, a speed at which the used space 410 returns to the free space 420 is slower than a speed at which the free space 420 changes to the used space 410, and the free space 420 of the write buffer gradually decreases and becomes exhausted over time.

As a result, a speed at which the write buffer receives write data (a write throughput performance of the FM module 100) decreases until the compression process performance of the first compression/decompression circuit 104. For example, if only data having a compression ratio of higher than 80% is written, the compression process performance of the first compression/decompression circuit 104 is 1.0 GB/s as illustrated in FIG. 4. In this case, the free space 420 of the write buffer becomes exhausted over time, the write throughput performance of the FM module 100 decreases until 1.0 GB/s. That is, the write throughput performance falls below the target write performance of 1.5 GB/s. To solve this problem, the FM module 100 according to the present embodiment secures the write performance based on the monitoring of the write buffer state.

Figures 6, 7:
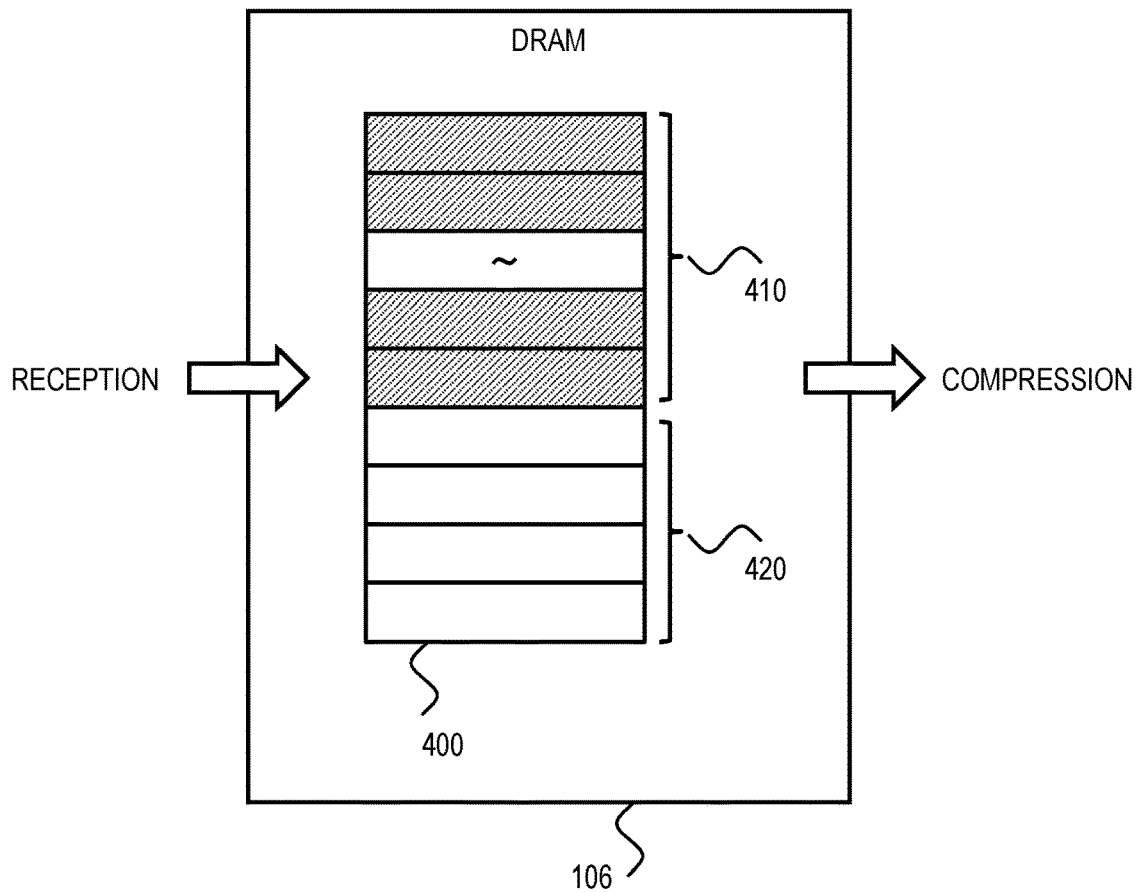
FIG. 6 is a diagram illustrating an example of a method of using a write buffer in Embodiment 1.
FIG. 7 is a diagram illustrating an example of a distribution ratio table in Embodiment 1.

Referring to FIG. 7, a process of securing the write performance of the FM module 100 will be described. FIG. 7 illustrates an example of a distribution ratio table showing a distribution ratio between the first method and the second method. For example, a distribution ratio table 500 is described in advance as a part of a program in the memory controller 103.

For example, the memory controller 103 monitors the number of entries in the free space 420 of the write buffer 400 at all times. The distribution ratio table 500 determines the proportion of write data compressed with the first method and the proportion of write data compressed with the second method according to the number of free entries of the write buffer 400.

As illustrated in FIG. 4, regardless of the compression ratio, the compression process performance of the second method is 2.5 GB/s or higher, which exceeds the target write performance of 1.5 GB/s. That is, the memory controller 103 compresses write data with the second method such that the free space 420 of the write buffer gradually increases and an effect of improving the write performance can be obtained.

When the number of free entries is 20 or more as in the first line of the column 510 of the distribution ratio table 500, the memory controller 103 determines that the free space 420 of the write buffer is not exhausted (has a room), and selects to compress all (100%) the write data with the first method. However, when the memory controller 103 compresses all the write data with the first method, if only data having a high compression ratio is written, the number of free entries decreases and falls below 20 over time. In this case, as the number of free entries decreases as in the second to fifth lines of the column 510 of the distribution ratio table 500, the memory controller 103 increases the proportion of write data to be compressed with the second method.

For example, when the number of free entries is 5 to 9 as in the fourth line of the distribution ratio table 500, the memory controller 103 regularly changes compression methods that are applied to write data groups to be received subsequently such that the write data is distributed to the first method at a proportion of 25% and to the second method at a proportion of 75%. Specifically, for example, the memory controller 103 sequentially repeats a process of executing the compression with first method once and executing the compression with the second method three times such that the write data can be distributed to the first method at a proportion of 25% and to the second method at a proportion of 75%.

When the number of free entries is 4 or less as in the fifth line of the distribution ratio table 500, the memory controller 103 determines that the free space 420 of the write buffer is exhausted, and selects to compress all (100%) the write data with the second method such that the effect of improving the write performance is maximized.

As described above, as long as the write performance does not fall below the target write performance, the FM module 100 compresses the write data with the first method capable of further reducing the compression ratio and stores the compressed data in the flash memory 107. Accordingly, as compared to the storage apparatus in which the flash memory of the related art to which only the compression of the second method is applied is mounted, the storage apparatus 900 in which the flash memory 107 according to the present embodiment is mounted can reduce the amount of data to be stored.

The distribution ratios shown in the example of the distribution ratio table 500 of FIG. 7 are merely exemplary. In the example of FIG. 4, the minimum compression process performance of the first method is 1.0 GB/s, and the minimum compression process performance of the second method is 2.5 GB/s. When the compression process performance of the first method and the second method exceeds the target write performance, the free space 420 of the write buffer increases. That is, when x that satisfies 1.0x+2.5(1−x)>1.5 is the distribution ratio of the first method (that is, the distribution ratio of the second method is 1−x), the free space 420 of the write buffer increases. Accordingly, the distribution ratio table 500 is not particularly limited as long as the distribution ratio of the first method is x that satisfies the above-described inequality when the number of write buffer free entries falls below a predetermined number. It is preferable that, as the number of write buffer free entries increases, the distribution ratio of the first method increases.

[7] Method of Processing Write/Read Command

Figure 8:
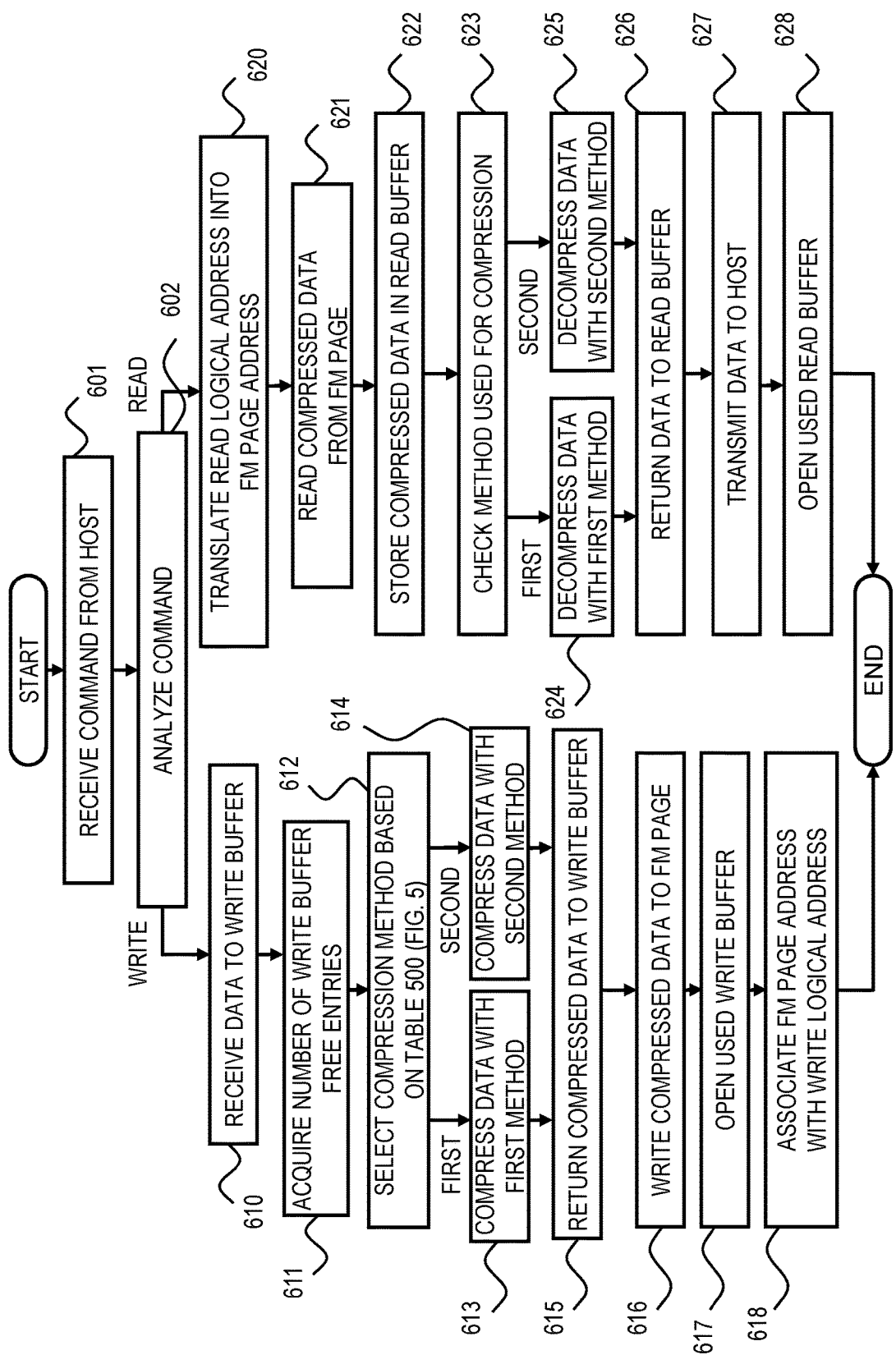
FIG. 8 is a flowchart illustrating an example of a write/read command process in Embodiment 1.

Next, referring to FIG. 8, an example of a procedure in which the FM module 100 processes a write/read command from an external device will be described. This procedure includes the above-described write performance securing process.

First, the memory controller 103 receives a command from the host (601). The memory controller 103 determines whether the command is a write command or a read command (602). If the command is a write command, the memory controller 103 proceeds to Step 610. If the command is a read command, the memory controller 103 proceeds to Step 620. Steps 610 to 618 are a write command process, and Steps 620 to 628 are a read command process.

First, the write command process will be described. The memory controller 103 receives write data to one free space 420 of the write buffer 400 and treats the space as used space 410 (610). The memory controller 103 acquires the number of free entries in the write buffer 400 (611). The number of free entries in the write buffer 400 is an example of the access performance to the flash memory 107. The memory controller 103 selects a compression method corresponding to the acquired number of entries from the distribution ratio table 500 (612).

If the first method is selected in Step 612, the memory controller 103 compresses data using the first compression/decompression circuit 104 (613) and proceeds to Step 615. In Step 613, the memory controller 103 calculates a compression ratio from the size of data before compression and the size of data after compression, and increments a count value corresponding to a change evaluation table described below.

If the second method is selected in Step 612, the memory controller 103 compresses data using the second compression/decompression circuit 105 (614) and proceeds to Step 615. In Step 614, the memory controller 103 increments a count value not shown in the change evaluation table described below. The memory controller 103 returns the compressed data to the used space 410 of the write buffer 400 (615). The compressed data is written to an unwritten page in the flash memory 107 (616).

After the writing in Step 616 ends, the memory controller 103 opens the used space 410 of the write buffer 400 such that the space returns to the free space 420 (617). Finally, the memory controller 103 associates an address of a data storage destination page in the flash memory 107 with a write logical address designated by a write command from the host (618). For example, the memory controller 103 generates an address translation table on the DRAM 106 and registers the association in the address translation table. For example, the memory controller 103 also registers information indicating whether the compressed data stored in the flash memory 107 is compressed by the first method or the second method in the translation table together with the storage destination page address. Here, the write command process ends.

Next, the read command process will be described. The memory controller 103 translates a read logical address designated by a read command from the host into an address of the data storage destination page in the flash memory 107 that is associated in the address translation table on the DRAM 106 (620). The memory controller 103 reads the compressed data from a page indicated by the translated page address in the flash memory 107 (621).

The memory controller 103 stores the read compressed data in one read buffer in the DRAM 106 (622). The memory controller 103 determines whether the read compressed data is compressed with the first method or the second method using the address translation table (623).

If the memory controller 103 determines that the read data is compressed with the first method in Step 623, the memory controller 103 decompresses the data using the first compression/decompression circuit 104 (624) and proceeds to Step 626. If the memory controller 103 determines that the read data is compressed with the second method in Step 623, the memory controller 103 decompresses the data using the second compression/decompression circuit 105 (625) and proceeds to Step 626.

The memory controller 103 returns the decompressed data (that is, data before compression) to the read buffer (626). The memory controller 103 transmits the decompressed data to the host as response data of the read command (627). Finally, the memory controller 103 opens the read buffer that was being used by the decompressed data (628). Here, the read command process ends.

[8] Securing of Read Performance using Compression Method Change

Among the compressed data stored in the flash memory 107, the FM module 100 according to the present embodiment recompresses data compressed with the first method with the second method to secure that the read performance is higher than or equal to the target read performance. Hereinbelow, the principle will be described with reference to FIGS. 9A and 9B.

FIG. 9A illustrates an example of the change evaluation table. A change evaluation table 700 is a table that is managed by the memory controller 103 to evaluate the influence when the compression method of data stored in the flash memory 107 is changed from the first method to the second method. For example, the change evaluation table 700 is stored in the DRAM 106.

A column 710 of the change evaluation table 700 shows the compression ratios of data compressed with the first method using five ranges at intervals of 20%. As described above, as the compression ratio becomes lower, data can be more sufficiently compressed.

In each of the compression ratio ranges of the first method, two count values of a column 720 includes: a count value 721 indicating the amount of compressed data corresponding to the compression ratio in the range present in the flash memory 107; and a count value 722 indicating the amount of data recompressed with (method-changed to) the second method among the compressed data corresponding to the compression ratio in the range. These count values increase or decrease due to data writing or compression method change.

For example, if stored data compressed with the first method at a compression ratio of 30% is updated to data compressed with the first method at a compression ratio of 70%, the value of the count value 721 in a range of 21% to 40% decrements by one, and the value of the count value 721 in a range of 61% to 80% increments by one. For example, if stored data compressed with the first method at a compression ratio of 90% is recompressed with the second method, the value of the count value 721 does not change, and the value of the count value 722 in a range of 81% to 100% increments by one.

In each of the compression ratio ranges of the first method, a column 725 shows an average decompression throughput performance during decompression using the first method. That is, the column 725 stores the same information as the column of the decompression process performance included in the column 220 of FIG. 4. In each of the compression ratio ranges of the second method, a column 726 shows an average decompression throughput performance during decompression using the second method. That is, the column 726 stores the same information as the column of the decompression process performance included in the column 240 of FIG. 4.

In each of the compression ratio ranges of the first method, a column 730 shows the degree to which the compression ratio deteriorates on average when a case of the data recompressed with the second method is compared to a case of the data compressed with the first method. That is, the column 730 stores the same information as the column 230 of FIG. 4.

In each of the compression ratio ranges of the first method, a column 740 shows the degree to which the decompression process performance is improved on average if the data is recompressed with the second method. That is, the column 740 shows a difference obtained by subtracting the value of the column 725 from the value of the column 726. For example, if data in a compression ratio range of 61% to 80% in the first method is recompressed with the second method, the decompression performance of the data is improved from 1.2 GB/s to 2.6 GB/s. Therefore, the corresponding cell of the column 740 stores a value of +1.4 GB/s.

In each of the compression ratio ranges of the first method, a column 750 stores an index indicating the degree to which the compression ratio deteriorates on average if the decompression performance is improved by 1 GB/s by recompressing the data with the second method. Hereinafter, this index will be referred to as "improvement cost". In each of the ranges, the improvement cost refers to a quotient obtained by dividing the value of the column 730 by the value of the column 740.

An example of FIG. 9A shows that the compression ratio deteriorates by +5.5% on average if data in a compression ratio range of 41% to 60% in the first method is recompressed with the second method to improve the decompression performance by 1 GB/s. If data in a compression ratio range of 1% to 20% in the first method is recompressed with the second method, the read performance deteriorates instead. Therefore, the improvement cost cannot be evaluated. Accordingly, the cell of the column 750 corresponding to the range stores, for example, a null value. As the improvement cost in the data in the compression ratio range decreases, an increase in the amount of stored data caused when the read performance is improved by recompressing the data with the second method becomes smaller.

Figure 9B:
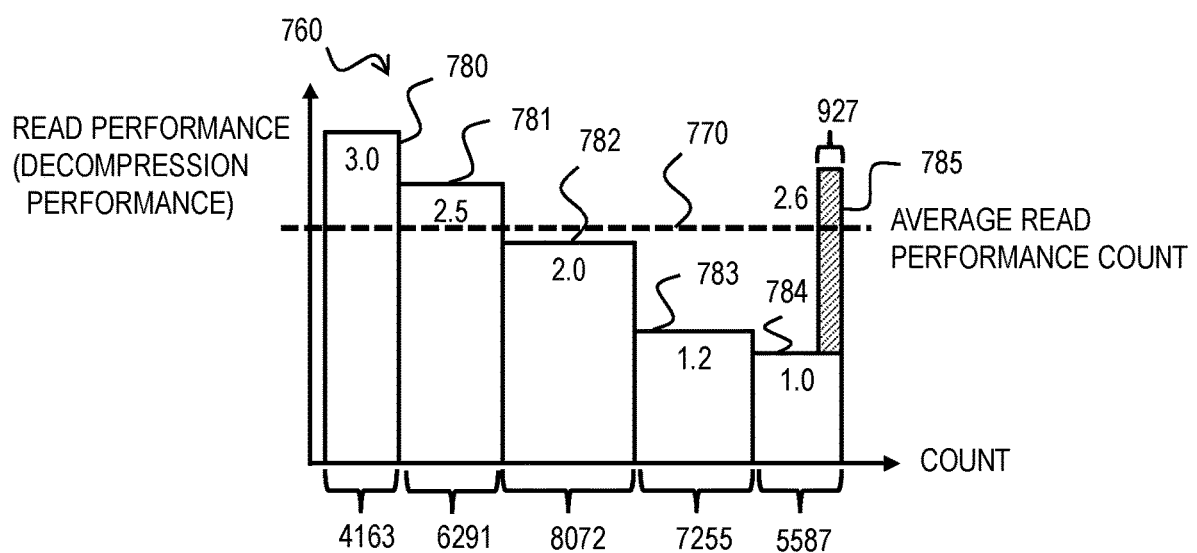
FIG. 9B is a graph illustrating an example of a principle of calculating an average read performance of data stored in a flash memory in Embodiment 1.

A graph 760 of FIG. 9B illustrates an example of a principle in which the memory controller 103 calculates an average read performance 770 (that is, average decompression performance) of data stored in the flash memory 107. For example, using the graph 760 in which the horizontal axis represents the count value shown in the column 720 of each of the compression ratio range and the vertical axis represents the average decompression performance of each of the compression ratio ranges, the memory controller 103 calculates a sum of areas of rectangles 780 to 785 formed in the respective compression ratio ranges, and divides the calculated sum by the sum of the count values to calculate the average read performance 770.

The rectangle 780 corresponds to the compression ratio range of 1% to 20%, the rectangle 781 corresponds to the compression ratio range of 21% to 40%, the rectangle 782 corresponds to the compression ratio range of 41% to 60%, the rectangle 783 corresponds to the compression ratio range of 61% to 80%, and the rectangle 784 corresponds to the compression ratio range of 81% to 100%. The rectangle 785 in which oblique lines are drawn corresponds to the improvement of the decompression performance when a part of data in the compression ratio range of 81% to 100% is recompressed with the second method.

For example, if the memory controller 103 determines that the average read performance calculated from the graph 760 falls below 2.2 GB/s (or a value obtained by adding a predetermined margin to the target read performance), the memory controller 103 recompresses a part of data compressed with the first method with second method. A method of selecting the part of data by the memory controller 103 will be described below. By the memory controller 103 changing the compression method of the part of data, the area corresponding to the improvement of the decompression performance, for example, the rectangle 785 of the graph 760 increases. Therefore, the average read performance 770 is improved, and the memory controller 103 can secure that the average read performance does not fall below the target read performance of 2.2 GB/s.

As described above, for example, as long as the read performance does not fall below the target read performance, the FM module 100 compresses the write data with the first method capable of further reducing the compression ratio and stores the compressed data in the flash memory 107. Accordingly, in the FM module 100 according to the present embodiment, the amount of stored data can be reduced as compared to an FM module in which only the second method is used.

[9] Reclamation Operation of Minimizing Compression Ratio when
Read Performance is Secured As described above, the memory controller 103 compresses a part of write data with the second method and stores the compressed data in the flash memory 107 to secure the write performance of the FM module 100. As illustrated in FIG. 4, when the data compressed with the second method is read and decompressed, the throughput performance is 2.6 GB/s.

When the average read performance of the FM module 100 largely exceeds the target read performance of 2.2 GB/s, the FM module 100 does not necessarily store the data in a state where it is compressed with the second method, and may recompress the data with the first method capable of further reducing the compression ratio such that the amount of data can be reduced. Therefore, as long as the average read performance exceeds the target read performance 2.2 GB/s, the FM module 100 according to the embodiment executes an operation of recompressing data, which is compressed with the second method in the flash memory 107, with the first method during reclamation and transferring the recompressed data to another block.

As described using FIGS. 9A and 9B, when the average read performance is similar to the target read performance of 2.2 GB/s, the FM module 100 secures that the average read performance does not fall below the target read performance. Therefore, among stored data compressed with the first method, for example, data in a compression ratio range having the lowest improvement cost is recompressed with the second method during reclamation, and the recompressed data is transferred to another block.

Figure 10:
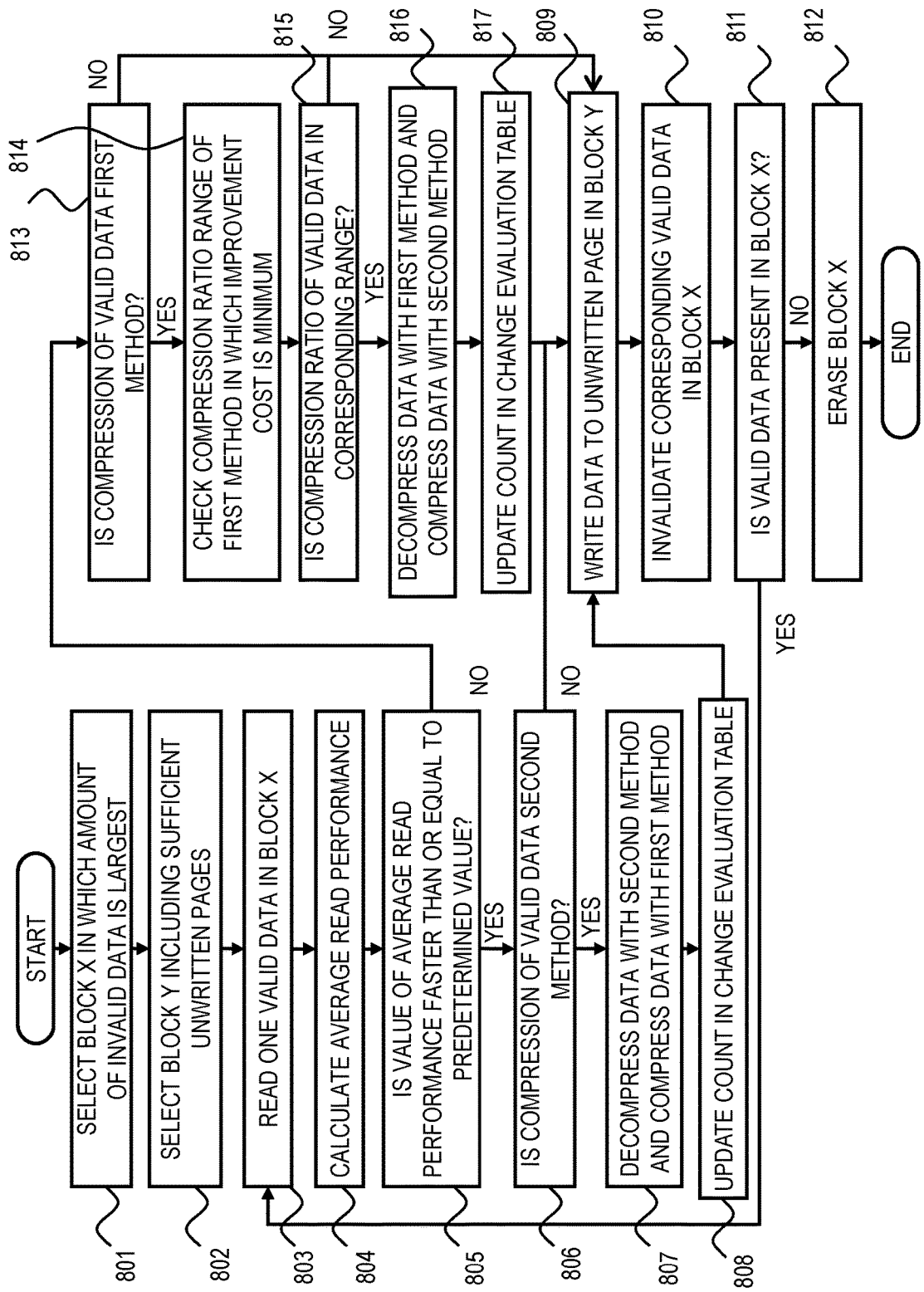
FIG. 10 is a flowchart illustrating an example of a reclamation process in Embodiment 1.

FIG. 10 is a flowchart illustrating an example of the reclamation operation by the FM module 100. With such a configuration, the FM module 100 can minimize the compression ratio of stored data when the read performance is secured.

If the memory controller 103 determines that it is necessary to increase the number of unwritten pages, the memory controller 103 selects a block X in which the amount of invalid data is the largest in the flash memory 107 (801). The memory controller 103 selects a block Y including sufficient unwritten pages for writing all the valid data (the most recent logical data) in the block X (802).

For example, the memory controller 103 randomly selects and reads one valid data in the block X (803). For example, the memory controller 103 calculates the average read performance 770 with the method described using the graph 760 (804). The average read performance 770 is an example of the access performance to the flash memory 107. The memory controller 103 determines whether or not the calculated value of the average read performance 770 is higher than a predetermined value (805). The predetermined value may be the target read performance 2.2 GB/s, or may be a value (that is, a value higher than 2.2 GB/s) obtained by adding a margin to the target read performance to reduce the possibility that the average read performance falls below the target read performance.

If the memory controller 103 determines that the value of the average read performance 770 is higher than or equal to the predetermined value (805: YES), the memory controller 103 proceeds to Step 806 to change the compression method to the first method capable of reducing the compression ratio. If the memory controller 103 determines that the value of the average read performance 770 is higher than or equal to the predetermined value (805: YES), the memory controller 103 may proceed to Step 809.

On the other hand, if the memory controller 103 determines that the value of the average read performance 770 is lower than the predetermined value (805: NO), the memory controller 103 proceeds to Step 813 to change the compression method to the second method capable of improving the read performance.

Referring to the address translation table on the DRAM 106, the memory controller 103 determines whether or not the compression method of valid data read from the block X in Step 803 is the second method (806). If the memory controller 103 determines that the compression method of the valid data is the second method (806: YES), the memory controller 103 decompresses the valid data using the second compression/decompression circuit 105 and compresses the decompressed data using the first compression/decompression circuit 104 (807). The memory controller 103 updates the count value of the column 720 corresponding to the valid data in the change evaluation table 700 (808) and proceeds to Step 809.

On the other hand, if the memory controller 103 determines that the compression method of the valid data is not the second method in Step 806 (806: NO), the memory controller 103 proceeds to Step 809 because the valid data are already compressed with the first method. The memory controller 103 writes the valid data compressed with the first method to an unwritten page of the block Y (809).

On the other hand, in Step 813, referring to the address translation table on the DRAM 106, the memory controller 103 determines whether or not the compression method of valid data read from the block X is the first method (813). If the memory controller 103 determines that the compression method of the valid data is not the first method (813: NO), the memory controller 103 proceeds to Step 809 because the valid data are already compressed with the second method.

On the other hand, if the memory controller 103 determines that the compression method of the valid data is the first method (813: YES), for example, the memory controller 103 checks a compression ratio range in which the improvement cost is the minimum in the column 750 of the change evaluation table 700 (814). For example, the memory controller 103 determines whether or not the compression ratio of the valid data belongs to the range having the minimum improvement cost clarified in Step 814 (815). If the memory controller 103 determines that the compression ratio of the valid data does not belong to the range (815: NO), the deterioration degree of the compression ratio caused by the compression method change is high. Therefore, the memory controller 103 proceeds to Step 809 without executing the compression method change.

On the other hand, if the memory controller 103 determines that the compression ratio of the valid data belongs to the range in Step 815 (815: NO), the memory controller 103 decompresses the valid data using the first compression/decompression circuit 104 and compresses the decompressed data using the second compression/decompression circuit 105 (816). The memory controller 103 updates the count value of the column 720 corresponding to the valid data in the change evaluation table 700 (817) and proceeds to Step 809.

In Step 809, the memory controller 103 writes the valid data compressed with the second method to an unwritten page of the block Y (809). Next, the memory controller 103 invalidates the valid data in the block X (810). The memory controller 103 determines whether or not valid data are still present in the block X (811). If the memory controller 103 determines that valid data are present in the block X (811: YES), the memory controller 103 returns to Step 803. If the memory controller 103 determines that valid data are not present in the block X (811: NO), the memory controller 103 erases the block X because all the data in the block X are invalid (812).

Thus, in the FM module 100 according to the present embodiment, using the valid data transfer in the reclamation operation of increasing the number of unwritten pages in the flash memory 107, the compression ratio of stored data can be minimized when the read performance is secured.

When changing the compression method in Step 807 or Step 816, the memory controller 103 may check the degree to which the compression ratio actually changes to update the deterioration degree of the column 730 and the improvement cost of the column 750 in the change evaluation table 700 based on the change amount. As a result, the memory controller 103 can further reduce the compression ratio of stored data.

In Step 814, for example, the memory controller 103 may select a predetermined number of compression ratio ranges in order from the lowest improvement cost in the column 750, or may select all the compression ratio ranges in which the improvement cost is lower than or equal to a predetermined first threshold in the column 750. In Step 814, for example, the memory controller 103 may determine whether or not the average read performance is lower than a predetermined threshold. If the memory controller 103 determines that the average read performance is lower than or equal to a predetermined second threshold, the memory controller 103 may select all the compression ratio ranges in which the improvement cost is a positive value in the column 750. In these cases, in Step 815, the memory controller 103 determines whether or not the compression ratio of the valid data belongs to the selected compression ratio ranges. The second threshold is a value lower than the target read performance.

Embodiment 2

[10] Other Embodiments

In Embodiment 1, the example in which the FM module 100 is applied to the storage apparatus 900 has been described. In the present embodiment, the FM module 100 according to Embodiment 1 may be applied to, for example, a server apparatus used as a temporary storage area (cash memory). To improve the hit rate of the cash memory to reduce the data access time of the server apparatus, it is important to reduce the amount of physical data to be stored in the FM module 100 such that a larger amount of logical data can be virtually stored. Therefore, the application of the FM module 100 according to Embodiment 1 to the server apparatus is effective.

In the present embodiment, the example in which the FM module 100 executes the compression method change process of minimizing the compression ratio of stored data when the read performance is secured using the reclamation operation has been described. However, this process may be executed at a time other than the reclamation operation. Specifically, for example, the FM module 100 may also execute the compression method change process using the valid data transfer that is executed in the refreshing operation. When a long period of time has elapsed after writing data to the flash memory, data failure gradually increases and cannot be corrected even using an error correction code. In the refreshing operation, to prevent the above-described problem, data is read from a page in which a predetermined time has elapsed after writing data, error in the read data is corrected, the data is transferred to another unwritten page, and the page in which the data is originally recorded is invalidated.

The effects of reducing the amount of data and securing the read performance that can be obtained by the compression method change process using the refreshing operation are the same as the effects that can be obtained by the compression method change process using the reclamation operation. In the FM module 100 according to the present embodiment, by simultaneously executing the compression method change process using the reclamation operation and the refreshing operation, it is not necessary to increase the number of times of writing to the flash memory only for the compression method change. By reducing the compression ratio, the number of times writing to the flash memory can be reduced, and the lifetime of the storage apparatus can be extended. Therefore, as in the present embodiment, it is desired not to unnecessarily increase the number of times of writing to the flash memory only for the compression method change.

The present invention is not limited to the embodiment and includes various modification examples. For example, the embodiments have been described in detail in order to easily describe the present invention, and the present invention is not necessarily to include all the configurations described above. A part of the configuration of one embodiment can be replaced with the configuration of another embodiment. The configuration of one embodiment can be added to the configuration of another embodiment. Addition, deletion, and replacement of another configuration can be made for a part of the configuration each of the embodiments.

Some or all of the above-described respective configurations, functions, treatment units, treatment means, and the like may be realized by hardware, for example, by designing an integrated circuit. The respective configurations, functions, and the like may be realized by software by a processor analyzing and executing a program that realizes each of the functions. Information of a program, a table, a file, or the like that realizes each of the functions can be stored in a recording device such as a memory, a hard disk, or an solid state drive (SSD) or a recording medium such as an IC card, an SD card, or a DVD.

The drawings illustrate control lines or information lines as considered necessary for explanations but do not illustrate all control lines or information lines in the products. It can be considered that almost of all components are actually interconnected.

The invention claimed is:

1. A storage apparatus comprising:
a flash memory that provides a storage area;
a controller that controls writing and reading of data to and from the storage area; and
a buffer memory that temporarily stores data to be written in the storage area,
wherein the controller selects one compression method from a first reversible compression method and a second reversible compression method based on access performance to the flash memory, and determines to compress data based on the selected one compression method and to write the compressed data to the storage area,
wherein the first reversible compression method has a lower compression ratio and a slower compression speed than the second reversible compression method, and
wherein the controller receives a write request to write data to the storage area, and selects the one compression method based on a size of a free space of the buffer memory during reception of the write request.

2. The storage apparatus according to claim 1, wherein the controller selects, as the free space of the buffer memory increases, the first reversible compression method as the one compression method at a higher proportion.

3. The storage apparatus according to claim 1, wherein, when a number of free entries in the buffer memory is more than or equal to a predetermined value, the controller selects the first reversible compression method as the one compression method at a first proportion, and
wherein a sum of a product obtained by multiplying the compression speed of the first reversible compression method by the first proportion and a product obtained by multiplying the compression speed of the second reversible compression method by a value obtained by subtracting the first proportion from 1 is greater than a predetermined target write speed.

4. A storage apparatus comprising:
a flash memory that provides a storage area;
a controller that controls writing and reading of data to and from the storage area; and a buffer memory that temporarily stores data to be written in the storage area, wherein the controller selects one compression method from a first reversible compression method and a second reversible compression method based on access performance to the flash memory, and determines to compress data based on the selected one compression method and to write the compressed data to the storage area, wherein the first reversible compression method has a lower compression ratio and a slower compression speed than the second reversible compression method, wherein the storage area stores first data that is compressed with one compression method from the first reversible compression method and the second reversible compression method, wherein the first reversible compression method has a slower decompression speed than the second reversible compression method, and wherein the controller determines whether or not to execute a compression method change of reading the first data from the storage area, decompressing the read first data, compressing the decompressed data with another compression method, and storing the compressed data in the storage area, based on a speed at which data stored in the storage area is read.

5. The storage apparatus according to claim 4, wherein the controller determines whether or not an average speed at which data stored in the storage area is read is faster than or equal to a predetermined target read speed, and determines whether or not to execute the compression method change based on a determination result.

6. The storage apparatus according to claim 5, wherein the one compression method is the second reversible compression method, and if the controller determines that the average speed is faster than or equal to the target read speed in the determination, the controller executes the compression method change.

7. The storage apparatus according to claim 5, wherein the one compression method is the first reversible compression method, and if the controller determines that the average speed is slower than the target read speed in the determination, the controller determines whether or not to execute the compression method change based on an improvement degree of the decompression speed and a deterioration degree of the compression ratio if the compression method change is executed.

8. The storage apparatus according to claim 4, wherein the controller determines whether or not to execute the compression method change when transferring the first data to another storage area, and if the controller determines to execute the compression method change, the controller executes the compression method change while executing the transfer.

9. The storage apparatus according to claim 8, wherein the controller determines whether or not to execute the compression method change when executing refreshing or reclamation on the storage area in which the first data is stored, and if the controller determines to execute the compression method change, the controller executes the compression method change while executing the refreshing or the reclamation.

10. A control method of a storage apparatus including a flash memory that provides a storage area and a buffer memory that temporarily stores data to be written in the storage area, the control method comprising:

selecting one compression method from a first reversible compression method and a second reversible compression method based on access performance to the flash memory;

determining to compress data based on the selected one compression method and to write the compressed data to the storage area, wherein the first reversible compression method has a lower compression ratio and a slower compression speed than the second reversible compression method;

receiving a write request to write data to the storage area; and selecting the one compression method based on a size of a free space of the buffer memory during reception of the write request.

11. The control method according to claim 10, further comprising:

selecting the first reversible compression method as the one compression method at a higher proportion as the free space of the buffer memory increases.

12. The control method according to claim 10, further comprising:

selecting the first reversible compression method at a first proportion when a number of free entries in the buffer memory is more than or equal to a predetermined value, wherein a sum of a product obtained by multiplying the compression speed of the first reversible compression method by the first proportion and a product obtained by multiplying the compression speed of the second reversible compression method by a value obtained by subtracting the first proportion from 1 is greater than a predetermined target write speed.

13. The control method according to claim 10, wherein the storage area stores first data compressed with one compression method from the first reversible compression method and the second reversible compression method, the first reversible compression method has a slower decompression speed than the second reversible compression method, and in the control method, whether or not to execute a compression method change of reading the first data from the storage area, decompressing the read first data, compressing the decompressed data with another compression method, and storing the compressed data in the storage area is determined based on a speed at which data stored in the storage area is read.

* * * * *